United States Patent
Yamada

(10) Patent No.: US 8,370,028 B2
(45) Date of Patent: Feb. 5, 2013

(54) ROAD INFORMATION SENSING SYSTEM, METHOD AND PROGRAM

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 1060 days.

(21) Appl. No.: 11/787,910

(22) Filed: Apr. 18, 2007

(65) Prior Publication Data

US 2007/0250263 A1  Oct. 25, 2007

(30) Foreign Application Priority Data

Apr. 24, 2006  (JP) ................. 2006-119713

(51) Int. Cl.
- B60R 22/00 (2006.01)
- E05F 15/00 (2006.01)
- G05D 1/00 (2006.01)
- G05D 3/00 (2006.01)
- G06F 7/00 (2006.01)
- G06F 17/00 (2006.01)

(52) U.S. Cl. ............ 701/49; 701/36; 701/408; 701/445; 701/469; 701/495; 701/518; 701/519; 701/534; 340/988; 340/995.24; 340/995.25

(58) Field of Classification Search ................ 701/1, 36, 701/45, 49, 200, 205, 207, 208, 209, 213, 701/300, 116, 117, 400, 408, 409, 426, 445, 701/446, 448, 469, 495, 518, 519, 527, 534; 340/901, 903, 988, 995.1, 995.18, 995.24, 340/995.25

See application file for complete search history.

(56) References Cited

U.S. PATENT DOCUMENTS

| | | | | |
|---|---|---|---|---|
| 5,638,116 A | * | 6/1997 | Shimoura et al. | 348/118 |
| 5,739,848 A | * | 4/1998 | Shimoura et al. | 348/119 |
| 5,893,045 A | * | 4/1999 | Kusama et al. | 701/211 |
| 6,127,969 A | * | 10/2000 | Van Roekel | 342/357.13 |
| 6,285,393 B1 | * | 9/2001 | Shimoura et al. | 348/119 |
| 6,343,869 B1 | | 2/2002 | Kobayashi | |
| 6,449,557 B2 | * | 9/2002 | Ata et al. | 701/208 |
| 6,832,156 B2 | | 12/2004 | Farmer | |
| 7,374,320 B2 | * | 5/2008 | Horii et al. | 362/466 |

(Continued)

FOREIGN PATENT DOCUMENTS

| DE | 102 54 806 | 6/2004 |
|---|---|---|
| DE | 103 36 681 | 3/2005 |

(Continued)

OTHER PUBLICATIONS

Office action dated Mar. 24, 2009 in German Application No. 10 2007 019 309.4.

(Continued)

*Primary Examiner* — Thomas Tarcza
*Assistant Examiner* — Rami Khatib
(74) *Attorney, Agent, or Firm* — Harness, Dickey & Pierce, PLC

(57) ABSTRACT

A GPS sensor senses a current position of a vehicle. A map database stores map data. A controller obtains road information of a road ahead of the vehicle from the map data based on the sensed current position of the vehicle. Then, the controller measures a distance from the vehicle to a predetermined object, which serves as a sensing subject, on the road when the obtained road information is predetermined road information. Then, the controller outputs the measured distance as control information of the vehicle.

13 Claims, 6 Drawing Sheets

U.S. PATENT DOCUMENTS

| | | | |
|---|---|---|---|
| 7,375,622 B2 * | 5/2008 | Takata et al. | 340/436 |
| 2002/0080617 A1 | 6/2002 | Niwa et al. | |
| 2002/0080618 A1 | 6/2002 | Kobayashi et al. | |

FOREIGN PATENT DOCUMENTS

| | | |
|---|---|---|
| JP | 05-196736 | 8/1993 |
| JP | 6-275104 | 9/1994 |
| JP | 09-304093 | 11/1997 |
| JP | 11-211492 | 8/1999 |
| JP | 2001-216309 | 8/2001 |
| JP | 2002-254980 | 9/2002 |
| JP | 2005-119661 | 5/2005 |
| JP | 2005-199801 | 7/2005 |
| JP | 2005-207821 | 8/2005 |

OTHER PUBLICATIONS

Office Action dated Nov. 29, 2011, in corresponding Japanese Application No. 2006-119713.

Office Action dated Jul. 19, 2011, in corresponding Japanese Application No. 2006-119713.

* cited by examiner

ROAD INFORMATION SENSING SYSTEM, METHOD AND PROGRAM

CROSS REFERENCE TO RELATED APPLICATION

This application is based on and incorporates herein by reference Japanese Patent Application No. 2006-119713 filed on Apr. 24, 2006.

BACKGROUND OF THE INVENTION

1. Field of the Invention

The present invention relates to road information sensing system, method and program.

2. Description of Related Art

A previously known navigation system senses a current position of a vehicle and displays a map around the current position of the vehicle on a display device by retrieving it from map data. Furthermore, the navigation system indicates an own vehicle position mark, which indicates the current position of the vehicle, on the map. In this way, an occupant of the vehicle can recognize the current position of the vehicle. In general, such a navigation system senses the current position of the vehicle based on both of absolute position data, which is obtained through a satellite navigation using a GPS sensor, and relative position data, which is obtained through a dead-reckoning navigation using, for example, a gyro sensor and a vehicle speed sensor. In such a case, when the own vehicle position mark is displayed on the map through direct use of the sensed current position, the own vehicle position mark may possibly be deviated from a corresponding road on the map due to influences of, for example, an error between the road, which is indicated by the map data, and the actual road. Thus, a map-matching process is performed to coincide the sensed current position of the vehicle with the road on the map, so that the position of the vehicle based on the map indicated by the map data is obtained.

Various types of processes have been proposed as the above ma-matching process to improve a degree of accuracy of the own vehicle position on the basis of the map, which is indicated by the map data. For example, Japanese Unexamined Patent Publication No. H09-304093 recites one technique. According to this technique, there is set a parameter, which serves as a threshold value for determining whether the current position of the vehicle needs to be corrected to place the current position of the vehicle on the road on the map. Then, the map-matching operation may be performed through use of the parameter, so that the best map-matching operation may be performed even when a road density changes. Furthermore, Japanese Unexamined Patent publication No. 2005-207821 recites another technique. According to this technique, two dimensional road surface data, which includes a road width of each link that indicates a corresponding predetermined road interval, is formed. When the current position of the vehicle is not present in the road surface data, correction of the current position of the vehicle on the road on the map is performed, so that an error is reduced in comparison to a case where the map-matching is performed on the basis of the link (one dimensional line data).

As described above, in the navigation system, it is important to display the current position of the vehicle in a manner that coincides with the map. Even in a case where the map, which is indicated by the map data, differs significantly from the actual road, it has been demanded that the position of the vehicle is displayed in the manner that coincides with the road on the map.

In the recent years, it has been considered to implement an appropriate vehicle control operation, which is appropriate for a current state of a road, by linking the navigation system with the vehicle control operation. For example, in some cases, optical axes of left and right headlights, which are arranged in a vehicle front side, are made to be adjustable in a plane that is parallel with a road surface. Here, the optical axes of the left and right headlights are adjusted in accordance with the road state (a road direction on the vehicle front side), which is determined based on the map that is indicated by map data.

However, as discussed above, the previously proposed map-matching process is aimed to improve the degree of accuracy of the position of the vehicle on the basis of the map that is indicated by the map data, and an accuracy of the position of the vehicle on the basis of the actual road is not really considered. Thus, in a case where the degree of accuracy of the current position of the vehicle on the basis of the actual road is not sufficient, when the above technique is used in a vehicle control operation, timing for performing the vehicle control operation may possibly be deviated from appropriate timing due to, particularly, an error (an error in a front to back direction of the vehicle) of the current position of the vehicle along the road. This kind of the problem becomes particularly serious when the vehicle control operation is related to vehicle safety.

SUMMARY OF THE INVENTION

The present invention addresses the above disadvantages. Thus, it is an objective of the present invention to provide road information sensing system, method and program, which enable determination of a position of a vehicle on an actual road with a relatively high degree of accuracy.

To achieve the objective of the present invention, there is provided a road information sensing system on a vehicle. The road information sensing system includes a position sensing means, a map storage means, a state information obtaining means, a distance measuring means and an information outputting means. The position sensing means is for sensing a current position of the vehicle. The map storage means is for storing map data. The state information obtaining means is for obtaining road information of a road ahead of the vehicle from the map data based on the sensed current position of the vehicle, which is sensed with the position sensing means. The distance measuring means is for measuring a distance from the vehicle to a predetermined object, which serves as a sensing subject, on the road when the obtained road information, which is obtained with the state information obtaining means, is predetermined road information. The information outputting means is for outputting the measured distance, which is measured with the distance measuring means, as control information of the vehicle.

To achieve the objective of the present invention, there is also provided a road information sensing method. According to the method, a current position of a vehicle is sensed. Then, road information of a road ahead of the vehicle is obtained from map data based on the sensed current position of the vehicle. Next, a distance from the vehicle to a predetermined object, which serves as a sensing subject, on the road is measured when the obtained road information is predetermined road information. Thereafter, the measured distance is outputted as control information of the vehicle.

To achieve the objective of the present invention, there is provided a computer program embodied on a computer readable medium to perform the above method.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments of the present invention will be described with reference to the accompanying drawings.

First Embodiment

Figure 1:
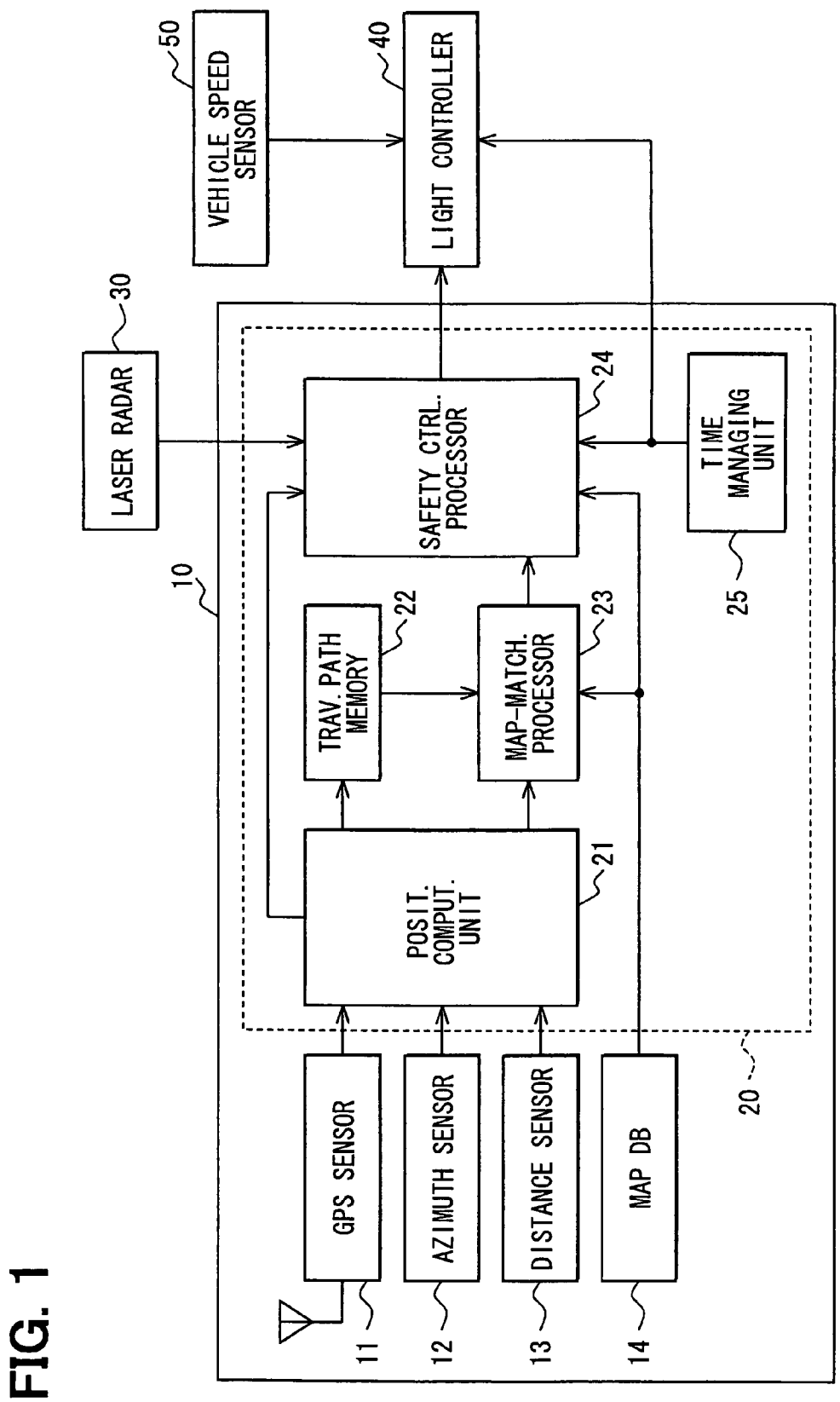
FIG. 1 is a block diagram showing a schematic structure of a navigation system according to a first embodiment of the present invention.

FIG. 1 is a block diagram, which schematically shows a structure of a navigation system 10, which serves as a road information sensing system according to a first embodiment of the present invention.

The navigation system 10 is installed in a vehicle 100 and includes a GPS sensor 11, an azimuth sensor 12, a distance sensor 13, a map database 14 and a controller 20.

The GPS sensor 11 receives GPS signals from GPS satellites and senses a current position (a latitude, a longitude and an altitude) of the vehicle 100 (hereinafter, also referred to as a current vehicle position) based on the received GPS signals.

The azimuth sensor 12 senses an absolute azimuth of the vehicle 100 based on geomagnetism.

The distance sensor 13 senses a traveled distance of the vehicle 100.

The map database 14 is implemented by a hard disk drive (HDD) and stores map data, which includes node data and link data of roads. Here, it should be noted that the node data indicates intersections and road branching points. Furthermore, the link data indicates roads, each of which connects between corresponding nodes. It should be understood that the map database 14 is not limited to the hard disk drive and may be implemented by a portable storage medium, such as a magnetic disk, a magneto-optical disk or a semiconductor memory, from which the map data is retrievable.

The controller 20 includes a microcomputer as its main component to execute various processes. The microcomputer includes a CPU, a ROM, a RAM, an I/O device and a bus line. The bus line interconnects the CPU, the ROM, the RAM and the I/O device. For example, the controller 20 executes a current position displaying process and a route guiding process. In the current position displaying process, the controller 20 computes the current vehicle position based on measurement signals received from the GPS sensor 11, the azimuth sensor 12 and the distance sensor 13. The controller 20 retrieves a map, which indicates an area around the current vehicle position, from the map data stored in the map database 14. Then, the controller 20 displays the retrieved map together with an own vehicle position mark, which indicates the current vehicle position, on a display device (or simply referred to as a display). In the route guiding process, the controller 20 searches a best route from the current vehicle position to a destination and guides the vehicle 100 along the route to the destination. The ROM of the controller 20 stores programs for executing various processes (see FIGS. 3 to 6).

Furthermore, the controller 20 receives information from a laser radar 30, which is installed in the vehicle 100.

The laser radar 30 is arranged in a front center of the vehicle 100 and includes a transmitter and a receiver. The transmitter transmits a directional laser beam and swings the laser beam in a left-to-right direction. The receiver receives a reflected laser beam, which is transmitted from the transmitter and is reflected from a reflective object, which is located ahead of the vehicle 100. Based on the transmitted laser beam, which is transmitted from the transmitter, and the reflected laser beam, which is received by the receiver, the laser radar 30 senses the reflective object and measures a relative position of the reflective object relative to the vehicle 100.

Furthermore, the controller 20 periodically outputs vehicle front side road information and a corrected current vehicle position as control information to a light controller 40, which is installed in the vehicle 100. The vehicle front side road information is information, which is obtained from the map data and from which at least a road configuration of a vehicle front side road located ahead of the vehicle 100 is obtainable. The corrected current vehicle position is a current position of the vehicle 100, which is corrected through a map-matching process. Furthermore, in order to increase a degree of accuracy of the vehicle control operation, which is performed by the light controller 40, the controller 20 also outputs a degree of reliability of the current vehicle position, an actual measurement value of a distance (an object distance) from the vehicle 100 to a predetermined object (a predetermined landmark), which is a sensing subject on the road, and the measurement time, at which the object distance is measured, as the control information supplied to the light controller 40.

Figure 2A:
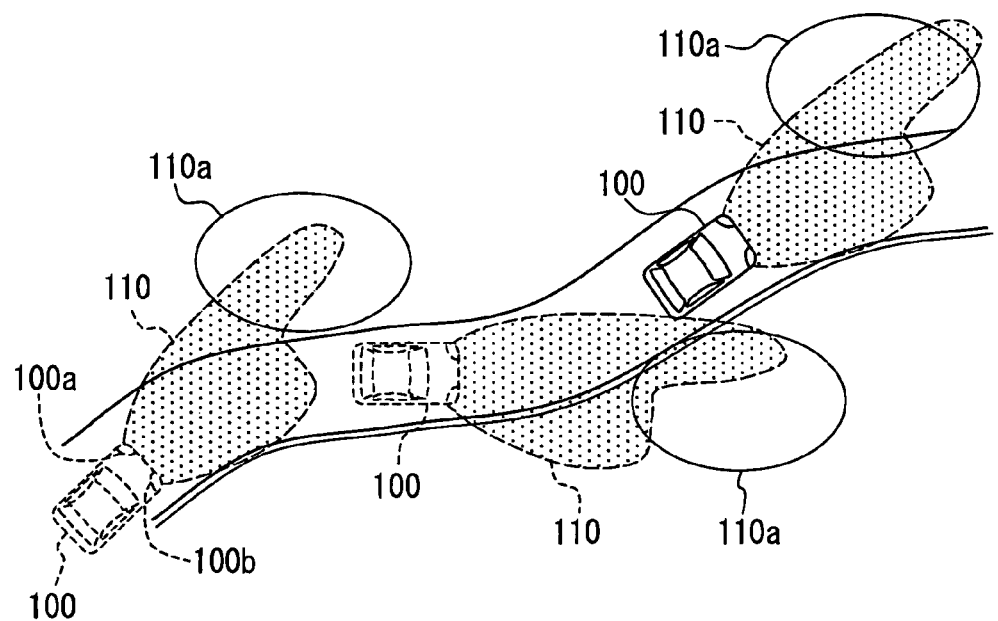
FIGS. 2A and 2B are descriptive diagrams showing light control operations.
Figure 2B:
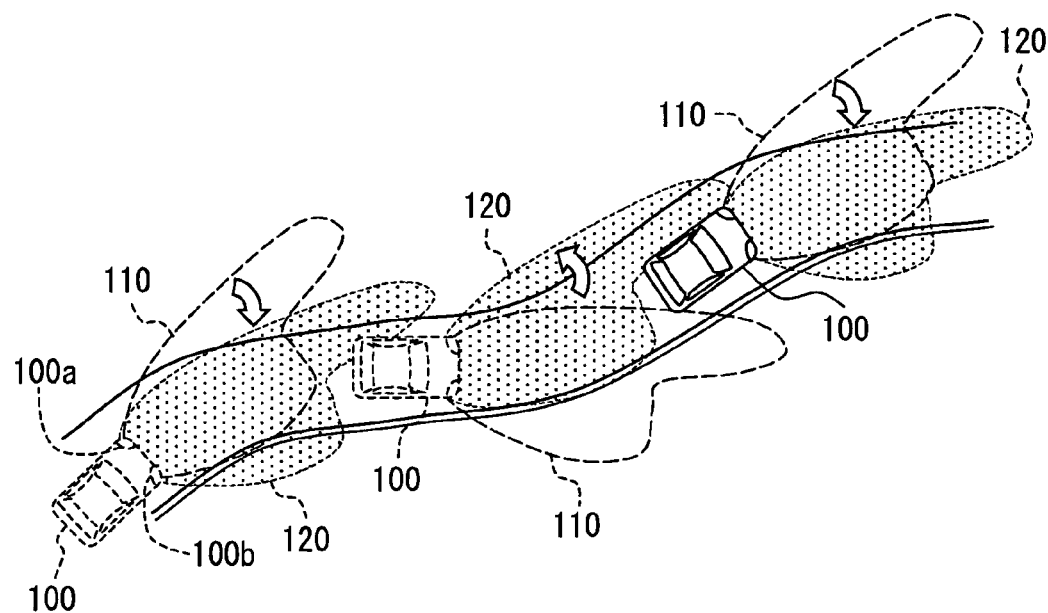

The light controller 40 includes a microcomputer as its main component and is communicatable with the controller 20 of the navigation system 10 through a communication line. The microcomputer of the light controller 40 includes a CPU, a ROM, a RAM, an I/O device and a bus line. The bus line interconnects the CPU, the ROM, the RAM and the I/O device. The light controller 40 performs a control operation (a light control operation) to change optical axes of left and right headlights 100a, 100b of the vehicle 100, which are arranged in the vehicle front, based on the control information, which is periodically outputted from the controller 20. Specifically, in a case where the optical axes of the headlights 100a, 100b are fixed, when the vehicle front side road is curved, the light of the headlights 100a, 100b cannot be appropriately irradiated in a travel direction of the vehicle 100, as indicated in FIG. 2A. Thereby, an irradiated area 110, which are irradiated by the headlights 100a, 100b, includes a wasteful irradiated area 110a that is outside of the road. Because of this, when the vehicle front side road is a curve, the optical axes of the headlights 100a, 100b are controlled to irradiate the light in the travel direction of the vehicle 100 to form an appropriate irradiated area 120 instead of the uncontrolled irradiated area 110, as shown in FIG. 2B. Specifically, a state of a curve (hereinafter referred to as "curve state") of the vehicle front side road is determined based on the vehicle front side road information and the corrected current vehicle position. When it is determined that the vehicle front side road is a right curve, the optical axes of the headlights 100a, 100b are adjusted by tilting the optical axes of the headlights 100a, 100b in a right direction in conformity with a degree of curvature of the curve (see the left end vehicle 100 or the right end vehicle 100 in FIG. 2B). In contrast, when it is determined that the vehicle front side road is a left curve, the optical axes of the headlights 100a, 100b are adjusted by tilting the optical axes of the headlights 100a, 100b in a left direction in conformity with a degree of curvature of the curve (see the intermediate vehicle 100 between the left end vehicle 100 and the right end vehicle 100 in FIG. 2B). Particularly, according to the present embodiment, when a degree of reliability of the current vehicle position, which is received from the controller 20 is relatively low, an adjustment amount (an adjustment angle) of the optical axes of the headlights 100a, 100b is relatively low. For example, in a case where the degree of reliability of the current vehicle position is middle, the adjustment amount of the optical axes of the headlights 100a, 100b is limited to 70% of the adjustment amount, which is set for a case where the degree of reliability of the current vehicle position is relatively high. In contrast, when the degree of reliability of the current vehicle position is relatively low, the adjustment amount of the optical axes of the headlights 100a, 100b is limited to 40% of the adjustment amount, which is set for the case where the degree of reliability of the current vehicle position is relatively high. In this way, deterioration in the control operation of the optical axes of the headlights 100a, 100b is reduced or minimized in the case where the information, which is received from the controller 20, contains a relatively large error.

Furthermore, the light controller 40 corrects the timing of the light control operation based on the object distance and the distance measurement time thereof, which are received from the controller 20. That is, the timing for executing the control operation can be determined based on the vehicle front side road information (the road information, which is received from the map data) and the corrected current vehicle position (i.e., the road configuration and the own vehicle position on the map), which is corrected through the map-matching process. However, the current vehicle position on the road of the map sometimes deviates from the current vehicle position on the actual road. Thus, a start point of the curve is determined based on a distance (object distance) from the vehicle 100 to a predetermined object (a predetermined one of reflector plates 130 in this embodiment) that is a sensing subject located on a subject road (a curved road), at which the light control operation needs to be executed, and the timing of the light control operation is corrected based on the determined start point of the curve. Specifically, the object distance is corrected according to an elapsed time period since the distance measurement time, at which the distance from the vehicle 100 to the predetermined object is measured, and the light control operation is executed based on the corrected object distance. That is, the elapsed time period (time lag) since the distance measurement time is computed based on the distance measurement time, which is received from the navigation system 10, and the current time, which is received from the time managing unit 25. An approximate traveled distance of the vehicle 100 since the measurement time, at which the object distance is measured, is computed by multiplying this elapsed time period with a vehicle speed, which is measured with a vehicle speed sensor 50 installed in the vehicle 100. Then, the computed traveled distance is subtracted from the object distance to correct the object distance. In this way, the correction can be made in view of the traveled distance of the vehicle 100 from the measurement time, at which the object distance is measured, to the execution time, at which the light control operation is executed.

Next, specific details of the operation, which is executed by the controller 20 of the navigation system 10, will be described.

The controller 20 includes (or functions as) an own vehicle position computing unit 21, a traveled path memory 22, a map-matching processor 23 and a safety control processor 24. Furthermore, the controller 20 includes (or functions as) a time managing unit 25, which provides common time (reference time) to the safety control processor 24 and the light controller 40. FIG. 1 shows a functional block diagram of the controller 20. The above components of the controller 20 do not need to be implemented by independent hardware devices, respectively. In other words, the above components of the controller 20 may be implemented by one common hardware device (or two or more common hardware devices).

Figure 3:
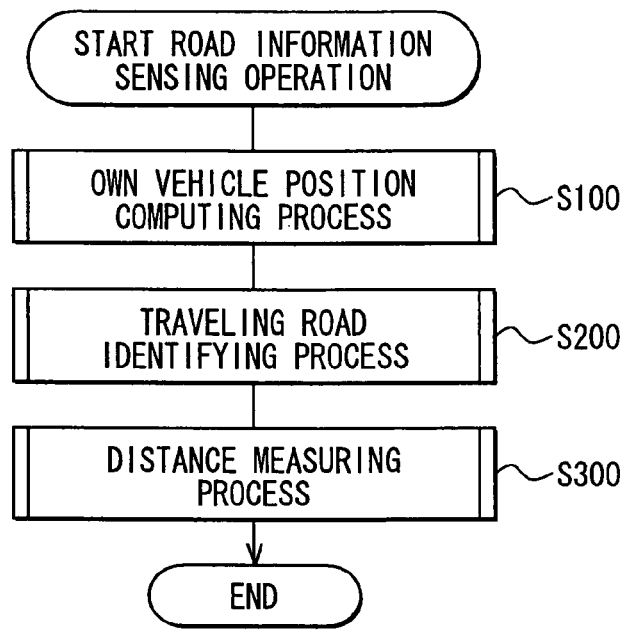
FIG. 3 is a flowchart of a road information sensing operation according to the first embodiment.

The controller 20 executes a road information sensing operation, which is depicted by a flowchart shown in FIG. 3, at predetermined intervals (e.g., every 100 ms). Specifically, when the road information sensing operation starts, at step S100, the own vehicle position computing unit 21 executes an own vehicle position computing process, which will be described latter with reference to FIG. 4. Then, at step S200, the map-matching processor 23 executes a traveling road identifying process, which will be described below with reference to FIG. 5. Thereafter, at step S300, the safety control processor 24 executes a distance measuring process, which will be described with reference to FIG. 6. Then, the road information sensing operation is terminated.

The processes, which are executed at steps S100, S200, S300, will be more specifically described.

Figure 4:
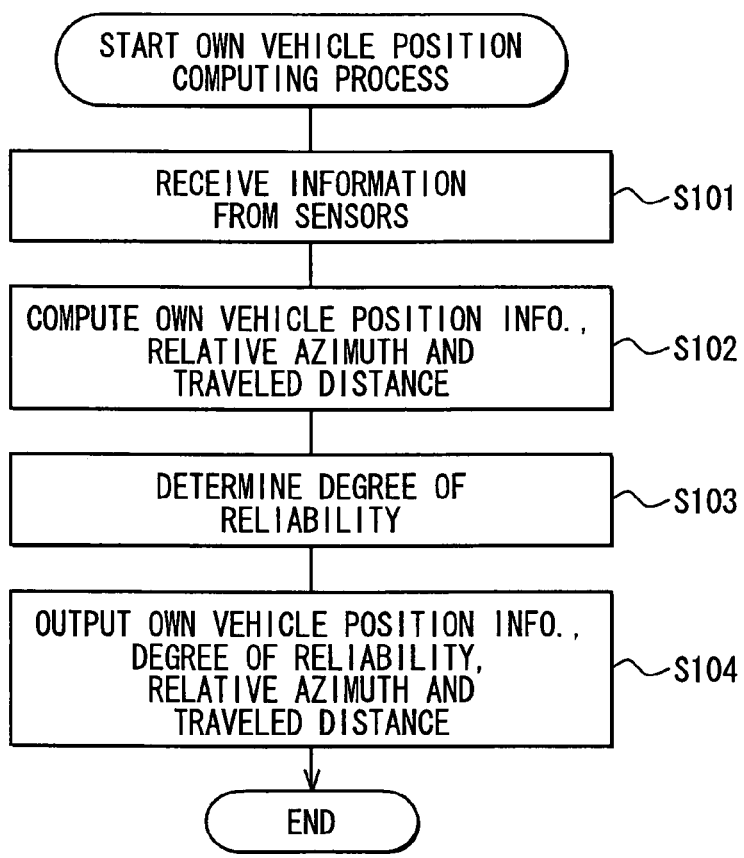
FIG. 4 is a flowchart of an own vehicle position computing process of the first embodiment.

First, the own vehicle position computing process (S100), which is executed by the own vehicle position computing unit 21, will be described with reference to the flowchart shown in FIG. 4.

When the own vehicle position computing process starts, sensed information is received from the GPS sensor 11, the azimuth sensor 12 and the distance sensor 13 at step S101.

Then, at step S102, based on the sensed information, which is received at step S101, a current vehicle position and an absolute azimuth (hereinafter, the current vehicle position and the absolute azimuth will be collectively referred to as "own vehicle position information") and a relative azimuth and a traveled distance of the vehicle 100 with respect to the position of the vehicle 100 at the previous measurement, which is conducted the predetermined time "t" ago.

Next, at step S103, a predicted error, which indicates a degree of accuracy of the current vehicle position sensed with the GPS sensor 11, is computed, and a degree of reliability of this current vehicle position (alternatively referred to as a degree of reliability of the own vehicle position information) is determined based on the computed predicted error. In the present embodiment, when the predicted error is relatively low (e.g., this may be a case where the predicted error is below a first threshold value A1), a degree of reliability of the current vehicle position is determined as "high". When the predicted error is relatively high (e.g., this may be a case where the predicted error is equal to or greater than a second threshold value A2, which is greater than the first threshold value A1), a degree of reliability of the current vehicle position is determined as "low". When the predicted error is equal to or greater than the first threshold value A1 but below the second threshold value A2, a degree of reliability of the current vehicle position is determined as "middle". That is, the degree of reliability of the current vehicle position is classified into the three classes. Here, the predicted error can be computed in various ways. In the present embodiment, the predicted error is determined based on, for example, the number of the GPS satellites, from which the GPS sensor 11 receives the GPS signals. Specifically, when the number of these GPS satellites is increased, the predicted error is reduced, and vice versa. Furthermore, the predicted error may be computed in view of influences of multipath. Also, the predicted error may be computed based on the locations of the GPS satellites (dilution of precision (DOP)). Furthermore, in a case where the error of the sensor is corrected through a filtering process with, for example, a Kalman filter, the predicted error may be computed according to this error correction. Specifically, in a case where a learning logic, which converges level of the noise contained in the sensed information of the sensor, is used, the predicted error may be reduced when the learning is progressed, i.e., when the stability of the sensed information is increased.

Thereafter, at step S104, the relative azimuth and the traveled distance are outputted to the traveled path memory 22, and the own vehicle position information is outputted to the map-matching processor 23 and the safety control processor 24, and the determined degree of reliability of the current vehicle position is outputted to the safety control processor 24. Then, the own vehicle position computing process is terminated. When the traveled path memory 22 receives the relative azimuth and the traveled distance from the own vehicle position computing unit 21, the traveled path memory 22 stores them as traveled path data.

Figure 5:
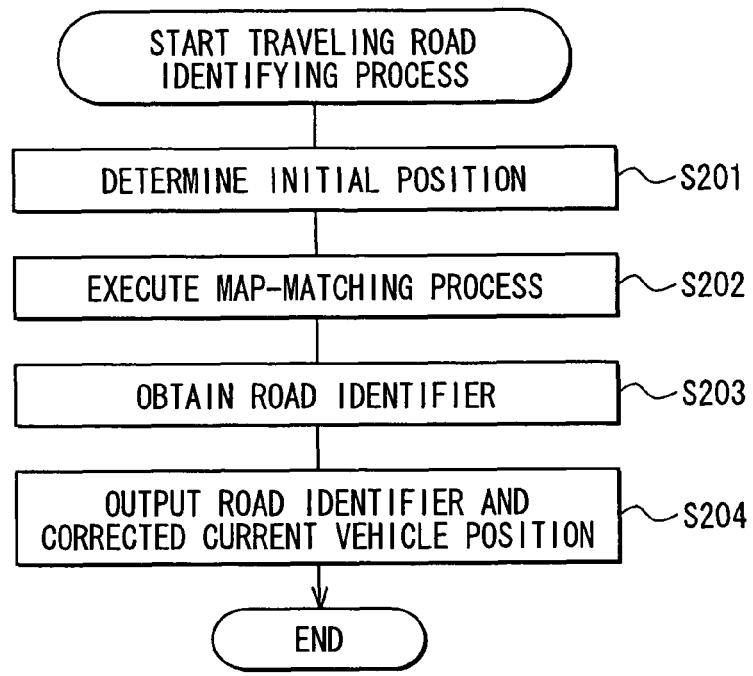
FIG. 5 is a flowchart of a traveling road identifying process of the first embodiment.

Next, the traveling road identifying process (S200), which is executed by the map-matching processor 23, will be described with reference to the flowchart shown in FIG. 5.

When the traveling road identifying process starts, at step S201, an initial position of the vehicle 100 is determined based on the own vehicle position information, which is received from the own vehicle position computing unit 21.

Then, at step S202, the map-matching process is executed to correct the current vehicle position on the basis of the map indicated by the map data stored in the map database 14. Specifically, the traveled path, which is indicated by the traveled path data stored in the traveled path memory 22, is compared with road patterns, which are indicated by the map data. Then, the most relevant road pattern, which shows the highest relevancy with respect to the traveled path, is determined as a currently traveling road (pattern matching). Thereafter, the current vehicle position is corrected to coincide with that road pattern.

Then, a road identifier (an identifier of a link contained in the map data), which serves as identification information of the currently traveling road of the vehicle 100, is retrieved from the map data.

Thereafter, at step S204, the road identifier, which is obtained at step S203, and the current vehicle position (hereinafter, referred to as "corrected current vehicle position"), which has been corrected through the map-matching process, are outputted to the safety control processor 24. Then, the traveling road identifying process is terminated.

Figure 6:
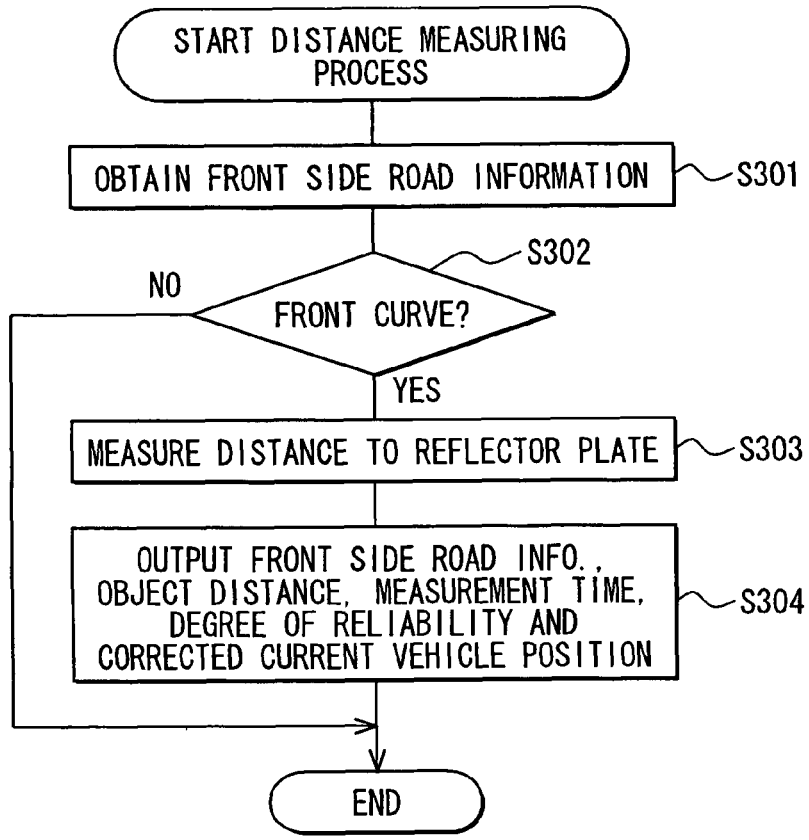
FIG. 6 is a flowchart of a distance measuring process of the first embodiment.

Next, the distance measuring process (step S300), which is executed by the safety control processor 24, will be described with reference to the flowchart shown in FIG. 6. At the time of starting the distance measuring process, the safety control processor 24 receives the reference time from the time managing unit 25.

When the distance measuring process starts, at step S301, vehicle front side road information, which indicates information of a road ahead of the vehicle (information, from which at least a road configuration of the vehicle front side road is obtainable), is obtained. This vehicle front side road information is obtained from the map data stored in the map database 14 based on the own vehicle position information, which is received from the own vehicle position computing unit 21, the road identifier, which is received from the map-matching processor 23, and the map data.

Thereafter, at step S302, it is determined whether a curve (predetermined road information) exists ahead of the vehicle 100 based on the vehicle front side road information, which is obtained at step S301. In other words, at step S302, it is determined whether the vehicle front side road information obtained at step S301 is the predetermined road information.

Figure 7A:
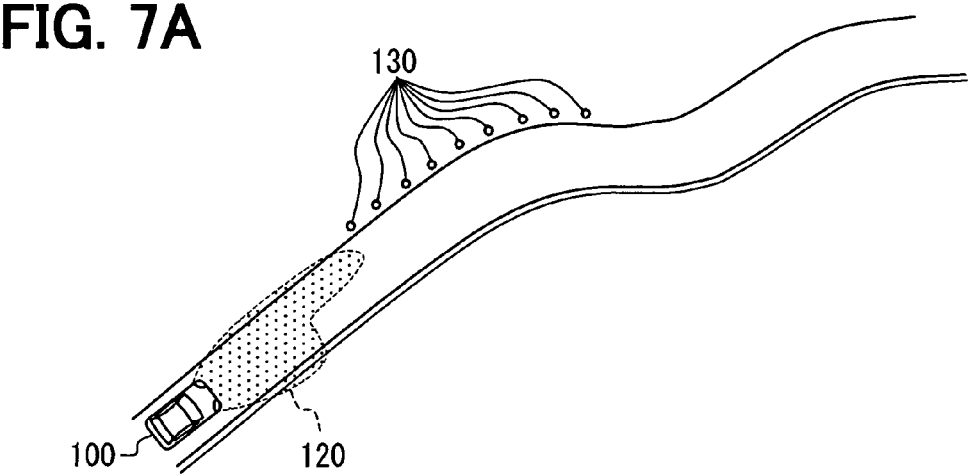
FIGS. 7A to 7C are descriptive diagrams showing an object distance measuring operation of the first embodiment.
Figure 7B:
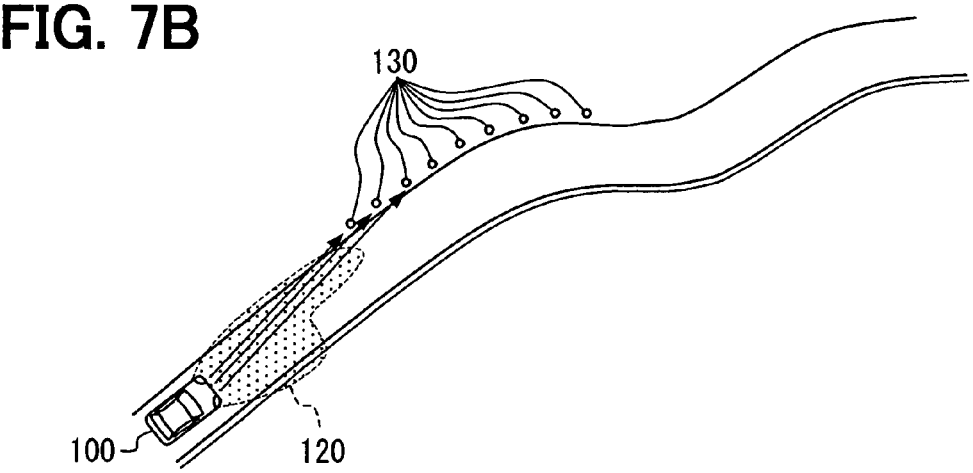
Figure 7C:
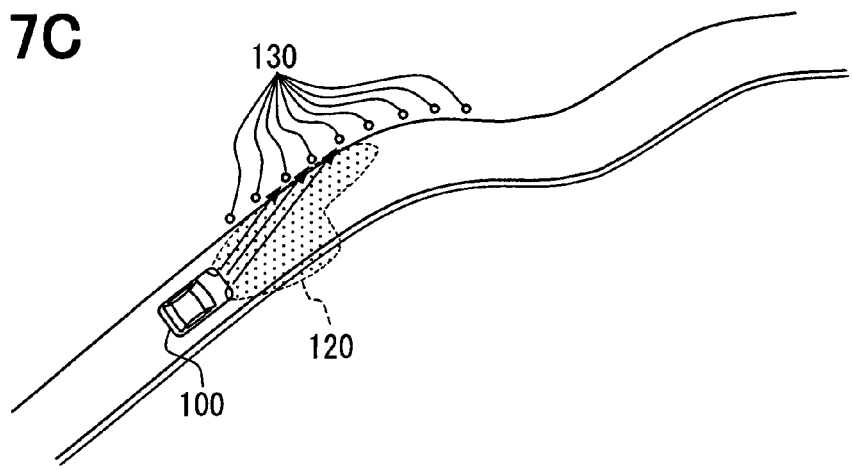

When it is determined that the curve exists ahead of the vehicle 100 at step S302, the operation proceeds to step S303. At step S303, the distance (object distance) from the vehicle 100 to the predetermined reflector plate 130, which is located at a start point of the curve, is measured based on the sensed information received from the laser radar 30. Specifically, a relative position of the predetermined reflector plate 130 on the road (a distance and direction of the predetermined reflector plate 130, such as the left end one of the reflector plates 130 in FIG. 7A, with respect to the vehicle 100) is measured (see FIGS. 7A to 7C). Normally, multiple reflector plates 130 are provided at a curved road. A relative position of each of the reflector plates 130 with respect to the vehicle 100 is measured. Then, based on the measured relative positions of the reflector plates 130, a road configuration of the vehicle front side road is estimated. Then, based on the estimated road configuration, the predetermined reflector plate 130, which is located at the start point of the curve, is identified.

Then, at step S304, the vehicle front side road information, which is obtained at step S301, the object distance, which is measured at step S303, the time (the distance measurement time) of measuring the object distance, the degree of reliability of the current vehicle position, which is received from the own vehicle position computing unit 21, and the corrected current vehicle position, which is received from the map-matching processor 23, are outputted to the light controller 40. Then, the distance measuring process is terminated.

When it is determined that the curve does not exist ahead of the vehicle 100 at step S302, the distance measuring process is terminated without executing the processes at steps S303, S304. Here, the distance measuring process may be terminated even in the presence of the curve ahead of the vehicle 100 unless the headlights 100a, 100b are turned on.

Figure 8:
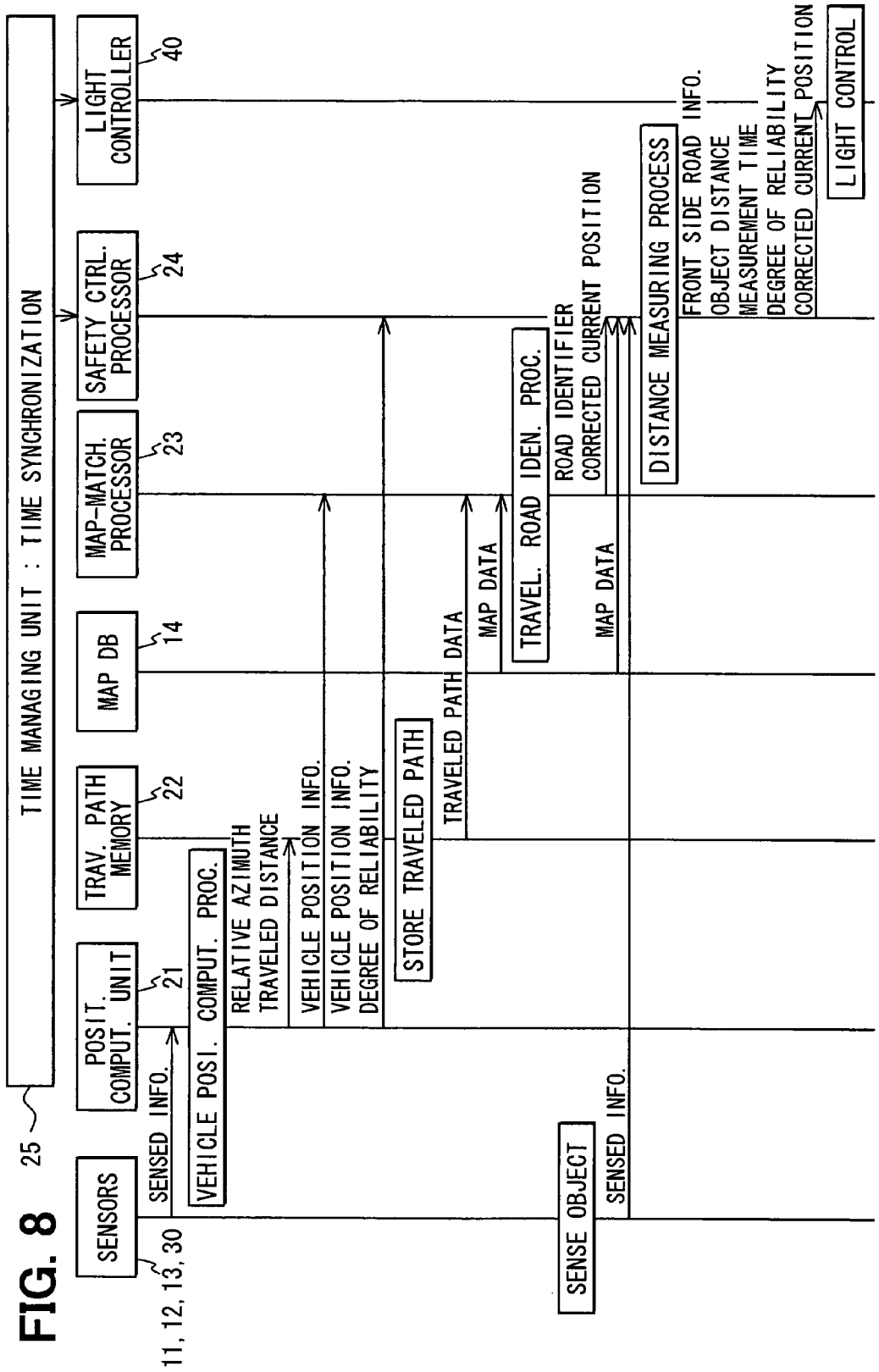
FIG. 8 is a time chart showing the operation executed by the navigation system.

Next, the operation, which is performed by the navigation system 10 of the first embodiment, will be described with reference to a time chart of FIG. 8.

During the traveling of the vehicle 100, the own vehicle position computing unit 21 computes the own vehicle position information (the current position and the absolute azimuth), the relative azimuth and the traveled distance of the vehicle 100 based on the sensed information, which is received from the GPS sensor 11, the azimuth sensor 12 and the distance sensor 13. Also, the own vehicle position computing unit 21 determines the degree of reliability of the current vehicle position. Then, the relative azimuth and the traveled distance are outputted to the traveled path memory 22, and the own vehicle position information is outputted to the map-matching processor 23 and the safety control processor 24, and the determined degree of reliability of the current vehicle position is outputted to the safety control processor 24.

The traveled path memory 22 stores the relative azimuth and the traveled distance, which are received from the own vehicle position computing unit 21, as the traveled path data.

The map-matching processor 23 executes the map-matching process based on the traveled path data, which is stored in the traveled path memory 22, and the map data, which is stored in the map database 14. Then, the map-matching processor 23 corrects the current vehicle position and obtains the road identifier from the map data. Thereafter, the map-matching processor 23 outputs the road identifier and the corrected current vehicle position to the safety control processor 24.

The safety control processor 24 obtains the vehicle front side road information from the map data based on the own vehicle position information, which is received from the own vehicle position computing unit 21, the road identifier, which is received from the map-matching processor 23, and the map data, which is stored in the map database 14. When it is determined that the curve exists ahead of the vehicle 100 based on the obtained vehicle front side road information, the distance (the object distance) from the vehicle 100 to the predetermined reflector plate 130, which is located at the start point of the curve, is measured based on the sensed information received from the laser radar 30. The vehicle front side road information, the object distance, the distance measurement time, the degree of reliability of the current vehicle position, which is received from the own vehicle position computing unit 21, and the corrected current vehicle position, which is received from the map-matching processor 23, are outputted to the light controller 40.

In this way, the light controller 40 determines the curve state of the vehicle front side road based on the vehicle front side road information and the corrected current vehicle position. Furthermore, the light controller 40 corrects the timing of the light control operation based on the object distance and the distance measurement time and then executes the light control operation.

As discussed above, according to the first embodiment, the navigation system 10 outputs the distance (the object distance) from the vehicle 100 to the predetermined reflector plate 130 at the start point of the curve to the light controller 40 as the control information. Therefore, the light controller 40 can relatively accurately perform the light control operation in comparison to the previously proposed technique, in which the position of the vehicle 100 on the actual road is determined based only on the map data.

Furthermore, the navigation system 10 outputs the degree of reliability of the current vehicle position to the light controller 40. Thus, the light controller 40 can effectively perform the light control operation according to the degree of reliability of the current vehicle position.

Furthermore, the navigation system 10 outputs the distance measurement time to the light controller 40. Therefore, the light control operation is relatively accurately performed in view of the time (time lag), which is required from the time, at which the object distance is measured, to the time, at which the light control operation is executed.

According to the first embodiment, the light controller 40 determines the curve state of the vehicle front side road based on the vehicle front side road information and the corrected current vehicle position. However, the present invention is not limited to this. For example, the light controller 40 may be modified to directly receive the map data from the map database 14 and may determine the curve state of the vehicle front side road based on the directly received map data.

Furthermore, in the navigation system 10 of the first embodiment, the GPS sensor 11 corresponds to a position sensing means of the present invention, and the map database 14 corresponds to a map storage means of the present invention. Furthermore, the controller 20, which executes the process of step S103, corresponds to a reliability determining means of the present invention. The controller 20, which executes the process of step S301, corresponds to a state information obtaining means. The controller 20, which executes the process of step S303, corresponds to a distance measuring means of the present invention. The controller 20, which executes the process of step S304, corresponds to an information outputting means of the present invention.

Second Embodiment

Next, a navigation system 10 according to a second embodiment will be described.

A basic structure of the navigation system 10 of the second embodiment is the same as that of the first embodiment except the information outputted from the navigation system 10 to the light controller 40, which has the function different from that of the first embodiment. Specifically, at the navigation system 10 of the second embodiment, besides the information (the vehicle front side road information, the object distance, the distance measurement time, the degree of reliability of the current vehicle position and the corrected current vehicle position), which is outputted to the light controller 40 in the first embodiment, the own vehicle position information and the road identifier are outputted to the light controller 40. In the following description, components, which are similar to those of the first embodiment, will be indicated by the same numerals and will not be described further for the sake of avoiding the redundancy of the description.

The light controller 40, which cooperates with the navigation system 10 of the second embodiment, stores the own vehicle position information, which is received from the controller 20 of the navigation system 10, as the traveled path information. Specifically, the light controller 40 stores the own vehicle position information, which is received from the controller 20, in association with the degree of reliability of the current vehicle position and the road identifier, which are received along with the own vehicle position information. Through the storing of the own vehicle position information, local road information is created based on the traveled path of the own vehicle position information. In a case where the degree of reliability of the own vehicle position information is relatively high or in a case where the degree of accuracy of the road, which is indicated by the map data, is relatively low, the degree of accuracy of the road information becomes higher than the degree of accuracy of the map data. In a case where the traveled path information of the same road has been already stored, the information may not be renewed or may be always renewed. Furthermore, the information may be renewed in a case where the degree of reliability of the currently received own vehicle position information is higher than the degree of reliability of the stored own vehicle position information. Furthermore, in a case where the degree of reliability of the currently received own vehicle position information is the same as the degree of reliability of the stored own vehicle position, an average value of the currently received own vehicle position information and the stored own vehicle position information may be obtained, and the stored own vehicle position may be renewed with this average value.

Furthermore, in a case where the light control operation is performed at a location, the traveled path information of which is not stored in the light controller 40, the light controller 40 determines the curve state of the vehicle front side road based on the vehicle front side road information and the corrected current vehicle position, which are received from the controller 20, like in the first embodiment. That is, the light controller 40 determines the road configuration based on the map data. In contrast, in a case where the light controller 40 performs the light control operation at a location, the traveled path information of which has been already stored in the light controller 40 (the location where the road identifier received from the controller 20 coincides with the road identifier stored as the traveled path information in the light controller 40), the light controller 40 determines the curve state of the vehicle front side road based on the stored traveled path information and the own vehicle position information. Furthermore, even at the location, the traveled path information of which has been already stored in the light controller 40, in a case where the degree of reliability of the traveled path information is relatively low or in a case where it is determined that the degree of accuracy of the road indicated by the map data is relatively high (e.g., in a case an urban area), the light controller 40 may determine the curve state of the vehicle front side road based on the vehicle front side road information and the corrected current vehicle position.

Since the light controller 40 of the above described type is used, the controller 20 of the navigation system 10 according to the second embodiment outputs the own vehicle position information and the road identifier to the light controller 40. Specifically, with reference to FIG. 6, at step S304 of the distance measuring process, besides the vehicle front side road information, the object distance, the distance measurement time, the degree of reliability of the own vehicle position received from the own vehicle position computing unit 21, and the corrected current vehicle position received from the map-matching processor 23, the controller 20 outputs the own vehicle position information received from the own vehicle position computing unit 21 and the road identifier received from the map-matching processor 23 to the light controller 40.

The navigation system 10 of the second embodiment provides advantages similar to those of the first embodiment. Particularly, the navigation system 10 of the second embodiment outputs the own vehicle position information to the light controller 40, so that the light controller 40 can perform the light control operation with the relatively high degree of accuracy based on the traveled path information, which is formed based on the own vehicle position information.

Here, in the case where the vehicle front side road is the previously traveled road of its own vehicle 100, the vehicle front side road information and the corrected current vehicle position may not be outputted from the controller 20 to the light controller 40. Also, at the previously traveled road, the map-matching process itself may not be performed.

The present invention is not limited to the above embodiments, and the above embodiments may be modified in various ways.

For example, the navigation system 10 of the above embodiment outputs the distance from the own vehicle 100 to the corresponding one of the reflector plates 130, which is located at the start point of the curve, as the object distance to the light controller 40. However, the present invention is not limited to this. Specifically, the distance and the direction (the relative position) of each of all sensed reflector plates 130 may be outputted to the light controller 40. Then, at the light controller 40, the road configuration and the curve start position may be determined based on the information of the these sensed reflector plates 130. Furthermore, in place of the distance from the vehicle 100 to the predetermined object (the predetermined reflector plate 130), it is possible to output an average value of distances from the vehicle 100 to the reflector plates 130.

Furthermore, in the above embodiment, the light controller 40 changes the adjustment amount of the headlight in the vehicle control operation according to the degree of reliability of the current vehicle position received from the controller 20. However, the vehicle control operation according to the degree of reliability of the current vehicle position is not limited to this one and may be performed for various ones. For example, when the degree of reliability of the current vehicle position is relatively high, both of the left and right headlights may be adjusted. Also, based on the degree of reliability of the current vehicle position, only one of the left and right headlights may be adjusted. Also, the control items, which are controlled in the vehicle control operation, may be changed according to the degree of reliability of the current vehicle position. For example, when the degree of reliability of the current vehicle position is relatively high, a braking force of the vehicle 100 may be controlled in addition to the headlights. Also, when the degree of reliability of the current vehicle position is middle, only the headlights may be controlled. Furthermore, when the degree of reliability of the current vehicle position is relatively low, the vehicle control operation according to the road information may not be performed.

In the above embodiment, there has been described the navigation system 10 that outputs the information, such as the distance from the vehicle 100 to the predetermined object (predetermined reflector plate 130) on the road, to the light controller 40, which performs the light control operation. However, the present invention is not limited to this. That is, various types of information may be outputted from the navigation system 10 to any other vehicle control unit(s), which perform other vehicle control operation(s). Here, the other vehicle control operations may include the following ones.

(1) It is conceivable to have a vehicle control unit that performs a vehicle control operation (e.g., a vehicle decelerating control operation, a driver seat side lateral window glass opening operation), which is performed at the time of entering a railway crossing. In such a case, the navigation system 10 sets, for example, a crossing bar at the railway crossing as the predetermined object, which serves as the sensing subject. Then, the navigation system 10 measures a distance from the vehicle 100 to the crossing bar and outputs the measured distance to the vehicle control unit. In this way, the vehicle control unit can accurately determine the distance from the vehicle 100 to the rail crossing and thereby can accurately perform the vehicle control operation.

(2) It is conceivable to have a vehicle control unit that performs a vehicle control operation (e.g., a headlight lighting control operation, a window glass closing operation, an air conditioner inside air switching operation), which is performed at the time of entering a tunnel. In such a case, the navigation system 10 sets, for example, a signboard at an entry of the tunnel as the predetermined object, which serves as the sensing subject. Then, the navigation system 10 measures a distance from the vehicle 100 to the signboard and outputs the measured distance to the vehicle control unit. In this way, the vehicle control unit can accurately determine the timing of entering the tunnel and thereby can accurately perform the vehicle control operation.

(3) It is conceivable to have a vehicle control unit that performs a vehicle control operation (e.g., a turn indicator control operation, a voice guidance control operation), which is performed at the time of entering an intersection. In such a case, the navigation system 10 sets, for example, a traffic light at the intersection as the predetermined object, which serves as the sensing subject. Then, the navigation system 10 measures a distance from the vehicle 100 to the traffic light and outputs the measured distance to the vehicle control unit. In this way, the vehicle control unit can accurately determine the distance from the vehicle 100 to the intersection and thereby can accurately perform the vehicle control operation.

In the above embodiment, only the reflector plate 130 is used as the predetermined object, which serves as the sensing subject. However, the present invention is not limited to this. For example, any one or more of the predetermined objects, which are described in the above sections (1) to (3), may be additionally used as the sensing subjects. Specifically, with reference to FIG. 6, at step S302 of the distance measuring process, it may be determined whether the curve, the rail crossing, the tunnel or the intersection exists ahead of the vehicle 100. When it is determined that the curve exits ahead of the vehicle 100, the reflector plate 130 may be set as the predetermined object, which serves as the sensing subject. Also, when it is determined that the rail crossing exists ahead of the vehicle 100, the crossing bar may be set as the predetermined object, which serves as the sensing subjection. Furthermore, when it is determined that the tunnel exists ahead of the vehicle 100, the signboard may be set as the predetermined object, which serves as the sensing subject. In addition, when it is determined that the intersection exists ahead of the vehicle 100, the traffic light may be set as the predetermined object, which serves as the sensing subject. Then, the distance from the vehicle 100 to the identified object may be measured as the object distance. That is, the type of the predetermined object, which serves as the sensing subject, is changed based on the vehicle front side road information. In this way, the information from the navigation system 10 may be used in the multiple types of vehicle control operations.

Furthermore, in the navigation system 10 of the above embodiment, the predetermined object, which serves as the sensing subject, is sensed with the laser radar 30. However, the present invention is not limited to this. That is, besides the laser radar, the sensing device for sensing the predetermined object, which serves as the sensing subject, may be, for example, a millimeter wave radar, a camera or an infrared sensor. Furthermore, two or more of these sensing devices may be combined to improve the degree of sensing accuracy.

Furthermore, in the above embodiment, only the measurement time, at which the object distance is measured, is outputted to the light controller 40 as the time information. However, the present invention is not limited to this. For example, the measurement time, at which the current vehicle position and the absolute azimuth of the vehicle 100 are measured, may be outputted to the light controller 40. Also, the time, at which the road identifier is determined, may be outputted to the light controller 40. In this way, the correction of the object distance can be performed with the relatively high degree of accuracy.

Instead of outputting the time itself, a distance, which is obtained by multiplying the time with a vehicle speed, may be outputted. Specifically, the navigation system 10 may obtain sensed information from the vehicle speed sensor 50. Then, the vehicle speed may be multiplied with a difference between the time, at which the information is outputted to the light controller 40 (the time, at which the information is sensed or at which the determination is made), and the current time to obtain the traveled distance of the vehicle 100 from the time, at which the information is sensed or at which the determination is made, to the current time. Then, the computed traveled distance (or a distance that is obtained by subtracting the computed traveled distance from the object distance (the corrected object distance) may be outputted to the control unit 40 in place of the above time. In this way, the input of the sensed information of the vehicle speed sensor 50 at the light controller 40 may possibly be eliminated.

Also, the outputting of the time information and the degree of reliability of the current vehicle position may be eliminated.

Also, in the above embodiment, the system, in which the information is supplied from the navigation system 10 to the light controller 40, is described. However, the present invention is not limited to such a system. For, example, the navigation system 10 and the light controller 40 may be formed as one apparatus or system. Furthermore, the present invention is implemented in the navigation system in the above embodiment. However, the present invention may be implemented in any other suitable apparatus or system.

Additional advantages and modifications will readily occur to those skilled in the art. The invention in its broader terms is therefore not limited to the specific details, representative apparatus, and illustrative examples shown and described.

What is claimed is:

1. A road information sensing system on a vehicle, comprising:
    means for sensing a current position of the vehicle;
    means for storing map data;
    means for obtaining road information of a road ahead of the vehicle from the map data based on the current position of the vehicle;
    means for measuring a distance from the vehicle to one predetermined object selected from a plurality of predetermined objects on the road only when the road information is predetermined road information, which is contained in the map data and indicates one of a curve in the road, a railway crossing, a tunnel and an intersection located on the road ahead of the vehicle on a map of the map data;
    means for computing a predicted error which indicates a degree of accuracy of the current position of the vehicle;
    means for determining a degree of reliability of the current position of the vehicle based upon the computed predicted error;
    means for outputting the distance and the degree of reliability of the current position of the vehicle as control information of the vehicle; and
    means for controlling a device of the vehicle based on the control information including both the distance and the degree of reliability of the current position of the vehicle; wherein
    the measuring means changes the one predetermined object based on the road information.

2. The road information sensing system according to claim 1, wherein the outputting means also outputs a measurement time at which the distance is measured with the measuring means, as the control information.

3. The road information sensing system according to claim 1, wherein the measuring means measures the distance from the vehicle to the one predetermined object on the road through use of a radar.

4. The road information sensing system according to claim 1, wherein the controlling means controls a headlight of the vehicle as the device of the vehicle in such a manner that an optical axis of the headlight is adjusted based on the control information.

5. The road information sensing system according to claim 1, further comprising means for setting the one predetermined object according to the obtained road information, which is obtained with the obtaining means.

6. The road information sensing system according to claim 1, wherein the controlling means varies an amount of control of the device based on the degree of reliability of the current position of the vehicle.

7. The road information sensing system according to claim 1, wherein the one predetermined object is one of a crossing bar, a signboard and a traffic light.

8. A road information sensing method comprising:

sensing a current position of a vehicle;

obtaining road information of a road ahead of the vehicle from map data based on the current position of the vehicle;

setting a predetermined object from a plurality of predetermined objects based on the obtained road information measuring a distance from the vehicle to the predetermined object on the road only when the road information is predetermined road information, which is contained in the map data and indicates one of a curve in the road, a railway crossing, a tunnel and an intersection located on the road ahead of the vehicle on a map of the map data;

computing a predicted error which indicates a degree of accuracy of the current position of the vehicle;

determining a degree of reliability of the current position of the vehicle based upon the computed predicted error;

outputting the distance and the degree of reliability of the current position of the vehicle as control information of the vehicle; and controlling a device of the vehicle based on the control information including both the distance and the degree of reliability of the current position of the vehicle.

9. A computer program embodied on a computer readable medium to perform the method of claim 8.

10. The road information sensing method according to claim 8, wherein the step of measuring the distance from the vehicle to the predetermined object includes using radar to measure the distance from the vehicle to the predetermined object.

11. The road information sensing method according to claim 8, wherein the step of controlling the device of the vehicle includes controlling a headlight of the vehicle as the device of the vehicle in such a manner that an optical axis of the headlight is adjusted based on the control information.

12. The road information sensing method according to claim 8, wherein the step of controlling the device of the vehicle includes varying an amount of control of the device of the vehicle based upon the degree of reliability of the current position of the vehicle.

13. The road information sensing method according to claim 8, wherein the step of setting the predetermined object sets the predetermined object to one of a crossing bar, a signboard and a traffic light.

* * * * *